Figure 1:

United States Patent [19]

Hocker et al.

[11] 4,397,971

[45] Aug. 9, 1983

[54] THERMOPLASTIC PLASTICS CONTAINING BURR-SHAPED OR FIBROUS DOPED POLYACETYLENE PARTICLES AND PROCESS FOR THE PRODUCTION THEREOF

[75] Inventors: Jürgen Hocker, Bergisch-Gladbach; Rolf Dhein, Krefeld, both of Fed. Rep. of Germany

[73] Assignee: Bayer Aktiengesellschaft, Leverkusen, Fed. Rep. of Germany

[21] Appl. No.: 362,999

[22] Filed: Mar. 29, 1982

[30] Foreign Application Priority Data

Apr. 2, 1981 [DE] Fed. Rep. of Germany ....... 3113331

[51] Int. Cl.$^3$ ............................ C08J 3/12; C08J 3/14; C08L 1/14
[52] U.S. Cl. ........................................ 524/40; 524/39; 524/41; 525/86; 525/130; 525/146; 525/202; 525/177; 525/57; 525/184
[58] Field of Search .......................... 524/39, 40, 41; 525/202, 184, 146, 57, 177, 86, 130

[56] References Cited

U.S. PATENT DOCUMENTS

| | | | |
|---|---|---|---|
| 2,990,434 | 7/1961 | Smith | 585/416 |
| 3,005,795 | 10/1961 | Busse et al. | 525/146 |
| 3,119,799 | 1/1964 | Natta | 526/159 |
| 4,113,796 | 5/1965 | Bischoff et al. | 525/86 |

FOREIGN PATENT DOCUMENTS

| | | |
|---|---|---|
| 45905 | 2/1982 | European Pat. Off. . |
| 45908 | 2/1982 | European Pat. Off. . |
| 2072197 | 9/1981 | United Kingdom . |

*Primary Examiner*—Paul Lieberman
*Assistant Examiner*—Ana L. Carillo
*Attorney, Agent, or Firm*—Connolly and Hutz

[57] ABSTRACT

A process for the production of a thermoplastically processible polymer granulate or powder containing from 0.01 to 50%, by weight, of burr-shaped or fibrous, doped polyacetylene, in which a plastics material and the doped polyacetylene particles are mixed in the presence of an inert suspending liquid and said liquid is removed.

5 Claims, 1 Drawing Figure

THERMOPLASTIC PLASTICS CONTAINING BURR-SHAPED OR FIBROUS DOPED POLYACETYLENE PARTICLES AND PROCESS FOR THE PRODUCTION THEREOF

It is known to produce polyacetylenes by the polymerisation of acetylene using mixed organometallic catalysts (J. Polym. Sc. Vol 12, pages 11–20). It is also known to dope films of crystalline polyacetylene by a treatment using gaseous electron acceptor dopant additives to improve the electrical conductivity of the films (U.S. Pat. No. 4,222,903).

The present invention provides thermoplastic plastics which contain from 0.01 to 50%, by weight, preferably from 0.1 to 20%, by weight, more particularly from 0.5 to 5%, by weight, of doped polyacetylene in a finely distributed burr or fibre form, and also provides a process for the production thereof.

The starting point for the present invention is a suspension of polyacetylene particles in the form of small fibre balls or "burrs" (FIG. 1). This suspension is obtained by introducing gaseous acetylene at temperatures of from −100° to +80° C., with agitation, into a solution of a mixed organometallic catalyst in an organic solvent until a maximum of 30 g of polyacetylene has formed per liter of solution. The solvent for the catalyst which acts simultaneously as the suspending agent for the polyacetylene particles is usually an aliphatic or aromatic hydrocarbon which may be halogenated, for example, benzene, toluene, chlorobenzene, tetralin, methylene chloride or chloroform.

The mixed organometallic catalyst or Ziegler catalyst is a reaction product of, on the one hand, compounds of heavy metals of Groups IVb, Vb, VIb, VIIb, and VIII of the Periodic Table (Handbook of Chemistry and Physics, 47th Edition (1966), p. B 3-Chem. Rubber Company, Cleveland, Ohio/USA), and, on the other hand, aluminium alkyls or aluminium alkyl halides. Ziegler catalysts are known. For the production of the polyacetylene particles, preferably catalysts are used of from 0.05 to 0.2 mols of vanadium compound corresponding to the following general formula:

wherein
R$_1$ represents halogen (in particular chlorine);
R$_2$ and R$_3$ independently represent halogen (in particular chlorine) or OR$_5$ wherein R$_5$ represents C$_1$–C$_{20}$ (cyclo)alkyl; and from 0.1 to 20 mols, preferably from 1 to 10 mols, of an aluminium alkyl of the formulae from 0.1 to 20 mols, preferably from 1 to 10 mols, of

wherein
R$_4$ represents C$_1$–C$_{12}$ alkyl, preferably methyl, ethyl, propyl, isopropyl, isobutyl or octyl; and
X represents halogen.

Vanadium compounds which are particularly suitable include the following:

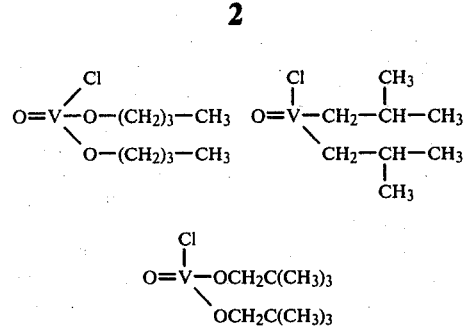

Aluminium alkyls which are particularly suitable include the following: triethylaluminium, tripropylaluminium, triisopropylaluminium, tributylaluminium, triisobutylaluminium and trioctylaluminium.

Solvents which are particularly suitable include hydrocarbons, such as benzene, toluene, hexane, cyclohexane, tetralin or decalin, and halogenated hydrocarbons, such as methylene chloride, chloroform or chlorobenzene.

The catalysts are prepared in a known manner by reacting the vanadium compound and the aluminium compound in the solvent at temperatures of from −100° to +30° C. Solutions which contain from 5 to 100 mmols of aluminium per liter of solvent are generally used for the subsequent polymerisation process. Acetylene is introduced into this solution in the absence of oxygen at temperatures of from −100° to +80° C., preferably from −80° to +20° C. A suspension of polyacetylene is produced during this process. Under a microscrope, the suspended particles appear as small burrs having a diameter of from 0.01 to 1.0 mm.

The thus-obtained suspensions of polyacetylene particles generally contain from 0.01 to 30 g per liter, preferably from 0.1 to 10 g per liter, of polyacetylene particles. Before treating this suspension further, it may be advantageous to homogenise it mechanically once again, for example, using an "Ultraturrax", and the fibrous structure of the particles should be maintained during this operation.

Before doping, the Ziegler catalyst in these suspensions must initially be deactivated or removed. This may be effected in conventional manner by adding alcohols, such as methanol, ethanol, or mixtures thereof, or by shaking with aqueous acids, for example hydrochloric acid. However, it is also possible to exchange the suspending agent in which the catalyst is dissolved. This may be effected when it is a matter of removing the catalyst components or if the suspending agent which is present is unsuitable for further processing.

For doping, the dopant additive is added to the suspension as such or in solution. The process may be carried out at temperatures of from −78° to +100° C., preferably from 10° to 30° C. The quantity of dopant additive is generally from 1×10$^{-5}$ to 4×10$^{-1}$ mols, preferably from 1×10$^{-3}$ to 2×10$^{-1}$ mols, per gram equivalent of —CH—units (=13 g of polyacetylene).

Excess dopant additive which may remain in the suspension, for example, may be removed by further exchange of the suspending agent or eliminated by suitable measures.

p-doping and n-doping are both possible. Oxidizing agents may be used for p-doping. Examples of such oxidizing agents are as follows: chlorine, bromine, iodine, ICl, halogen compounds, such as AsF$_5$, SbF$_5$, $SbCl_5$, $AsCl_5$, $PF_5$ and $POF_3$, oxides, such as NO, $NO_2$, conc. $H_2SO_4$, $H_2O_2$ and $CrO_3$, or oxygen, ozone or peroxy compounds.

Strong reducing agents are generally used for n-doping. Examples of such reducing agents are as follows: alkali metals or the naphthalides thereof, such as sodium, potassium and sodium naphthalide, or electron donors, such as amines.

It is possible to isolate the doped polyacetylene particles from the suspensions thereof, however, according to this invention the suspension is used as such. It is combined with a plastics material and the suspending agent is removed, thus generating a solid thermoplastic moulding composition. There are several embodiments of this method:

(1) If the plastics powder is insoluble in the suspending agent, it is suspended in the polyacetylene suspension and filtered together with the polyacetylene. A homogeneous mixture is then obtained.

(2) If the plastics material is soluble in the polyacetylene suspending agent, it is dissolved in the suspending agent is removed, for example, by spray- or freeze-drying or (3) the polymer is precipitated using a suitable precipitant and is filtered together with the doped polyacetylene.

Particularly suitable plastics include the following: polyethylene, polypropylene, polybutadiene, polyisoprene, polyvinyl halides (PVC), polyacrylonitrile, polymethacrylates, polyacrylamides, polyvinyl alcohol, polycarbonates, cellulose esters, polyamides, styrene-homo- and co-polymers (e.g. ABS), polyesters or polyurethanes.

Powders are obtained which are suitable for thermoplastic processing, but which may also be processed from solutions. These powders may also be used as powder lacquers for the production of coatings. The plastics according to the present invention containing doped polyacetylene have very good mechanical properties. The electrical conductivity may be varied within wide limits. It is particularly suitable to added doped polyacetylene to obtained antistatic properties of plastics.

PRACTICAL EXAMPLES

EXAMPLE 1

Preparation of the catalyst, polymerisation and processing 1.3 l of toluene are introduced into a 2 liter beaker equipped with a stirring apparatus and 300 ml of toluene are distilled off under a stream of nitrogen. With dry ice cooling, 4 ml (2 mmols) of bis-(2,2-dimethylpropoxy)-vanadium oxychloride, 0.5 molar in toluene, and 20 ml (20 mmols) of aluminium triisobutyl, 1 molar in toluene, are added at −78° C. During this addition, the apparatus is constantly under a stream of nitrogen. Pure acetylene is passed through at a rate of 10 l per hour for 1 hour with stirring. The polyacetylene is precipitated. It is in the form of a pink-violet burr-shaped structure having a diameter of from 0.05 to 0.5 mm. The thus-obtained suspension contains 4 g of polyacetylene per liter. The reaction is stopped using 0.5 g of 4-methyl-2,6-di-t-butylphenol (ionol), in 400 ml of absolute toluene and the reaction mixture is purged using nitrogen, the temperature rising to 20° C.

EXAMPLE 2

1000 ml of absolute methylene chloride are introduced into a 2 liter beaker equipped with a stirring apparatus. It is cooled to −78° C., and 4.2 ml (12,5 mmols) of titanium tetrabutylate (100%) and 50 ml (50 mmols) of aluminium triisobutyl, 1 molar in methylene chloride, are added.

10 g of acetylene are passed through the catalyst solution at −78° C. over a period of one hour, with stirring, and dark polyacetylene is precipitated. The reaction is stopped using a solution of 0.5 g of 4-methyl-2,6-di-t-butyl-phenol (ionol) in 5 ml of methanol and the temperature is allowed to rise to 20° C. under a stream of nitrogen. Under a microscope, the reaction mixture shows dark violet burr-shaped polyacetylene structures having a diameter of about 0.1 mm (FIG. 1). The suspension contains 2.5 g of polyacetylene per liter.

EXAMPLE 3

A solution of 4 g of iodine in 100 ml of toluene is added with stirring at 20° C. to 1 liter of a polyacetylene suspension prepared according to Example 1 and the mixture is subsequently stirred for 2 hours at room temperature. The originally violet solution fades and a suspension containing doped burr-shaped polyacetylene particles is obtained.

EXAMPLE 4

A suspension which was prepared according to Example 2 was doped using a solution of 2.5 g of iodine in 100 ml of methylene chloride, analogously to Example 3.

EXAMPLE 5

100 g of fine polyamide powder are added to 1 liter of a polyacetylene suspension according to Example 2 which was doped with iodine according to Example 4 and which contains 1 g of doped polyacetylene. By jointly filtering under suction, a grey polymer powder is obtained which produces antistatic mouldings after thermoplastic processing.

EXAMPLE 6

198 g of finely distributed polyacrylonitrile are added to 1 liter of a methylene chloride suspension according to Examples 2 and 4 which contains 2 g of iodine-doped polyacetylene. After filtering and drying, 200 g of a grey polyacrylonitrile powder containing polyacetylene is obtained which produces antistatic mouldings having a surface resistance of $10^7 \Omega$ during thermoplastic processing.

EXAMPLE 7

100 g of a polycarbonate are added to 1 liter of a suspension prepared according to Examples 2 and 4 and the mixture is stirred until the polymer has completely dissolved. The thus-obtained suspension is allowed to flow into 5 l of methanol, with stirring, and the polycarbonate is precipitated in the form of fine particles. After filtering and drying, a polycarbonate powder is obtained which contains doped polyacetylene in burr or fibre form and may be processed thermoplastically into antistatic mouldings.

EXAMPLE 8

$H_2SO_4$-doped and $SbCl_5$-doped polyacetylene suspensions may be prepared and processed analogously to Example 7.

EXAMPLE 9

100 g of polycarbonate are added to 1 liter of a polyacetylene suspension prepared according to Example 2 and doped with chromosulphuric acid and the mixture is stirred until the polycarbonate has completely dissolved. A fine polycarbonate powder containing doped polyacetylene particles which may be processed thermoplastically or via solution into antistatic mouldings or coatings is obtained by spray-drying from the thus-obtained suspension.

We claim:

1. A process for the production of a thermoplastically processible polymer granulate or powder which contains of from 0.01 to 50% by weight of burr-shaped or fibrous, doped polyacetylene which comprises mixing the polymer and the polyacetylene in the presence of an inert suspending liquid and removing said liquid.

2. A process for the production of a thermoplastically processible polymer granulate or powder which contains from 0.01 to 50% by weight of burr-shaped or fibrous, doped polyacetylene, which process comprises spray- or freeze-drying a plastics solution containing the doped polyacetylene particles.

3. A process for the production of a thermoplastically processible polymer granulate or powder containing from 0.01 to 50% by weight of burr-shaped or fibrous, doped polyacetylene, which comprises precipitating a plastics solution containing the doped polyacetylene particles using a suitable precipitant and filtering-off the plastics powder together with the doped polyacetylene particles.

4. A process for the production of a polymer powder containing from 0.01 to 50% by weight of burr-shaped or fibrous, doped polyacetylene, which comprises adding a plastics which is difficultly soluble in the suspending agent to a suspension containing the doped polyacetylene particles and filtering-off the plastics together with the doped polyacetylene.

5. Solid thermoplastic plastics of granulated material or powders according to claims 1 to 3, which contain from 0.01 to 50% by weight of doped polyacetylene in finely distributed burr- or fibreform.

* * * * *